Jan. 9, 1968  A. R. CRIPE ET AL  3,362,352
GAS TURBINE-ELECTRIC LOCOMOTIVE
Filed Jan. 7, 1966  2 Sheets-Sheet 1

INVENTORS
ALAN R. CRIPE
THOMAS R. WHEATON
RICHARD J. CASSIDY
BY
Richard M. James.
ATTORNEY United States Patent Office 3,362,352
Patented Jan. 9, 1968

3,362,352
GAS TURBINE-ELECTRIC LOCOMOTIVE
Alan R. Cripe, Richmond, Va., and Thomas R. Wheaton, Glastonbury, and Richard J. Cassidy, Bristol, Conn., assignors to United Aircraft Corporation, East Hartford, Conn., a corporation of Delaware
Filed Jan. 7, 1966, Ser. No. 519,368
6 Claims. (Cl. 105—49)

ABSTRACT OF THE DISCLOSURE

A drive system for a dual axle railway truck having a plurality of gas turbine engines that are selectively and automatically engaged or disengaged from a centrally located mixing gearbox, the gearbox having a pair of counterrotating propeller shafts transmitting power to the separate axles of the truck, the gas turbine engines being selectively adapted to drive either the truck or an alternator to furnish electrical power to the train.

This invention relates in general to drive systems for multiple axle trucks, particularly as applied to lightweight railway equipment.

In the design of modern high performance passenger trains considerable reliance is placed upon the technology formulated in the aerospace industry. As a result, and as the required performance of these trains has necessarily imposed greater demands on the vehicle, its powerplant and other components, substantial departures from the familiar concepts of train design have evolved. Compactness of components and minimum weight with due consideration for passenger comfort and safety have become prime objectives. New refinements are incorporated in the vehicle design to isolate the passenger from the effects of high speed travel, and resilient mountings and suspensions are utilized to provide a soft, vibration-free ride. Through the use of novel suspensions in some arrangements, railway cars are caused to bank in curves, this capability being achieved through the use of a pendulum support wherein controlled transverse movement is permitted between the bottom of the car and its running gear.

Another of the more basic objectives considered in connection with these newer trains is a substantial reduction in the transit time of the train between its point of origin and its destination when related to current schedules. The achievement of this objective necessitates not only a capability for high sustained speeds but also improved acceleration and deceleration characteristics, particularly on routes involving numerous intermediate stops. Since the attainment of the required acceleration is dependent to a great extent upon the provision of a favorable power-to-weight ratio in the train, considerable attention must necessarily be directed toward the development of lightweight structures in which aerospace knowhow has been utilized to great advantage.

For maximum performance and in order to reduce the unsprung weight in such systems the heavy components, such as motors or engines and their associated reduction gearing, are mounted on the vehicle structure with appropriate shafting extending therefrom to the axles to be driven. However, because of the high torques required to effect the necessary accelerations, and the resilience of the mountings and banking capabilities of the vehicle, an unfavorable reaction is produced at the car upon the application of power. The torque reaction causes the car to rotate about its longitudinal centerline at a time when passengers may still be in the boarding process. Accordingly, compensation must be provided either in the suspension systems or, more preferably, in the drive system to eliminate the effects of the torque reaction on the vehicle.

Further, it is often necessary to incorporate versatility into a truck drive system to accommodate varying types of power available at different locations along a railroad right-of-way. Some railroads, for example, depend upon electrification to provide power for their prime movers while others rely on internal combustion engines of one sort or another. In order to obviate the necessity for a locomotive change at the juncture of two divergent systems, it is advantageous to provide sufficient versatility in a single drive system to permit ready adaptation to the various power sources available. From a reliability standpoint it is further advantageous to provide a measure of redundancy in such a drive system with a substantial degree of flexibility through the automatic decoupling of inoperative units.

To eliminate the necessity for a turnaround at destination, the advanced drive will necessarily be operational in either the forward or the reverse direction giving the train a true bi-directional capability.

It is an object of the present invention to provide an improved drive system for lightweight railway vehicles.

It is a further object of the invention to provide a drive system wherein all unfavorable torque reactions are eliminated. This objective is achieved through the use of torque-balancing, counterrotating shafting between the vehicle structure and the running gear.

A still further object is to provide a lightweight versatile drive system for a dual axle truck.

An additional object is to provide a locomotive drive characterized by a high degree of reliability and incorporating a plurality of prime movers, preferably gas turbine engines, which are automatically disengageable in the event of a failure in any given engine.

Another feature is the provision of convenient means for shifting from a prime mover of one type to a prime mover of another type in a completely flexible drive system.

These and other objects and advantages of this invention will be set forth in the following description or will be evident therefrom or from practice of this invention.

The construction and operation of this invention can best be described by reference to the preferred embodiment shown in the drawings of which:

Figure 1:
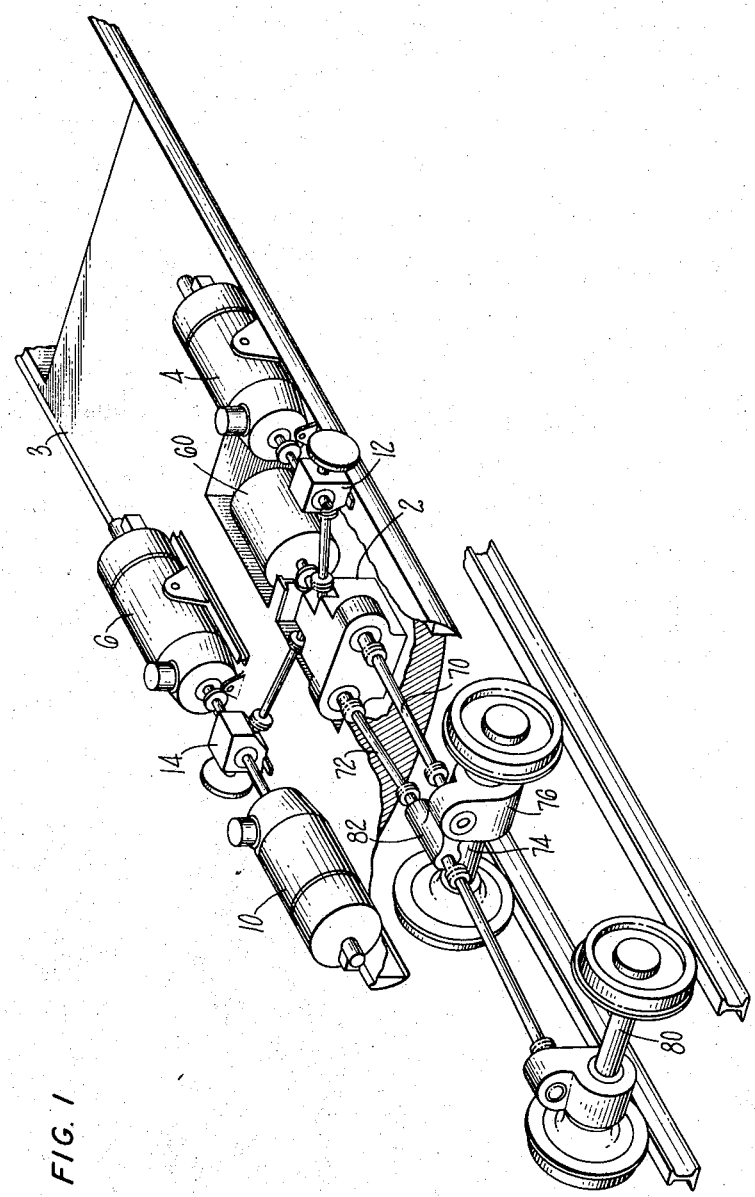
FIG. 1 is a perspective view of the drive system with all extraneous detail removed for the sake of clarity.

Described broadly, the present invention contemplates a plurality of prime movers, mounted to the structure of a vehicle, providing the power input to a centrally-located gearbox, the output from the gearbox being taken through a pair of counterrotating, universal-jointed drive shafts to the fore and aft driven axles, respectively, or a multiple-axle railway truck. As used herein, the term gearbox will be understood to include not only the housing but the contained gearing.

A centrally-located mixing gearbox 2 is shown mounted on a vehicle 3 at its bottom portion between four motors 4, 6, 8 and 10, which may be of any type but are preferably gas turbine engines for their very advantageous power-to-weight ratio. The respective engines are attached to the vehicle frame at the sides thereof with their respective axes aligned generally parallel to the longitudinal axis of the vehicle. Power is transmitted to the mixing gearbox 2 through a pair of right angle gearboxes, 12 and 14, which are appropriately aligned with the driven shafts of the respective turbines. For the purpose of weight-reduction the use of a single right angle gearbox for each pair of turbines is preferred, although it is not necessary.

Intermediate each of the motors and its right angle gearbox, and in the power train thereto, is a crown gear coupling 16 and an overrunning clutch 18. The coupling 16 is employed primarily to accommodate slight shaft misalignments and to facilitate the removal and replacement of the engines during periods of overhaul or repair. The respective overrunning clutches provide automatic decoupling of an inoperative engine and thus lend versatility and reliability to the overall drive system. For the sake of fuel economy, for example, since maximum power may only be needed during periods of acceleration, one or more of the engines may be shut down once the cruising speed has been attained. This may be particularly advantageous on the longer runs from a component durability aspect as well as from an economy viewpoint.

Figure 2:
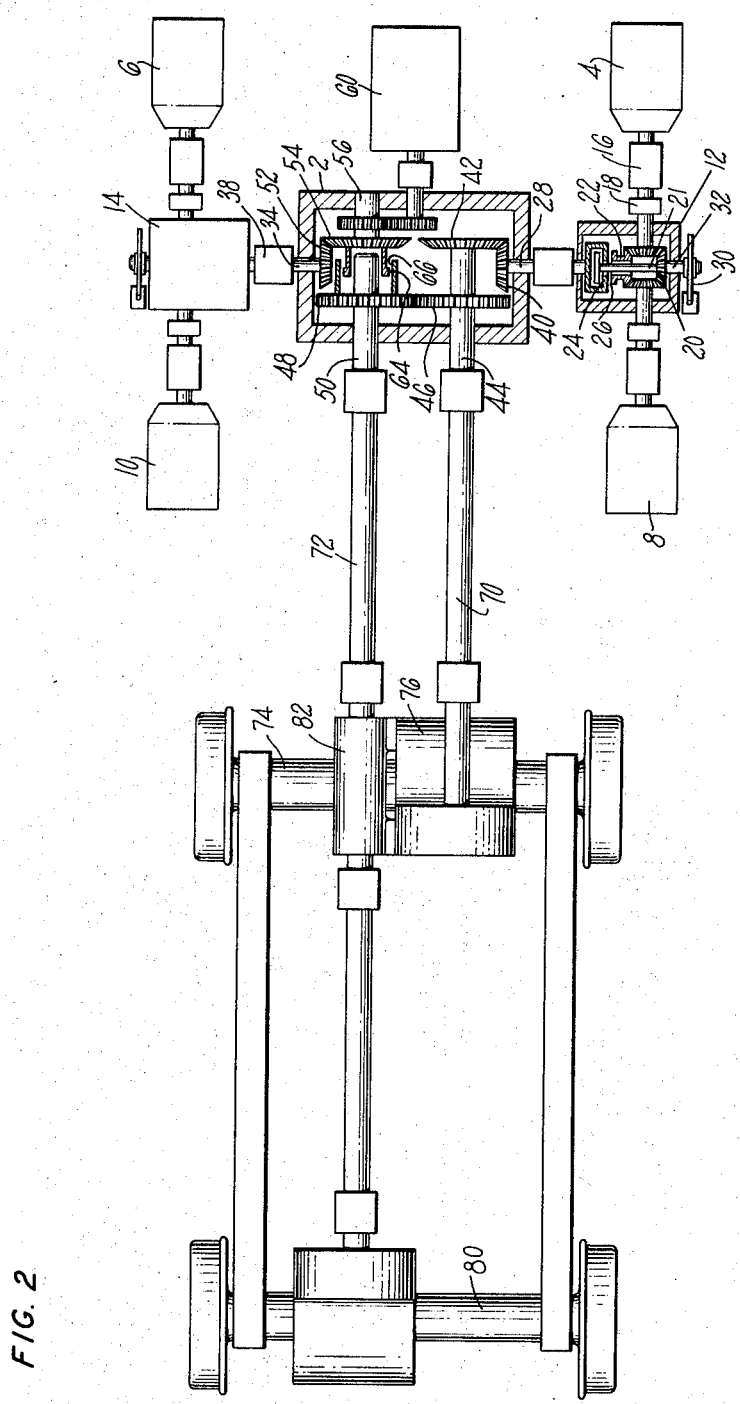
FIG. 2 is a schematic top view of the drive system illustrated generally in FIG. 1, shown partially in cross section to illustrate a preferred gearing arrangement for maximum versatility.

Each of the right angle gearboxes, in the embodiment shown, is fed by a pair of longitudinally opposed turbine engines, and power is taken from the gearbox through a set of bevel gears in the conventional manner. Included within each right angle gearbox is a clutch and reversing gear mechanism whereby the output shaft 28 may be caused to rotate in either a forward or reverse direction. It will be noted that the reversing mechanism will not be necessary in the drive train of any turbine being used solely for the generation of electric power, as hereinafter discussed. In a typical construction, as illustrated schematically in FIG. 2, gear 20 and connected shaft 21 rotate in a direction opposed to that of gear 22. Through the action of a remotely-operable clutch, as from the cab of the power unit, the gears may be meshed either at surfaces 24, wherein the output shaft 28 rotates in one direction, or at surfaces 26 which effects rotation of shaft 28 in the other direction. It will be noted that the input shafting always rotates in the same direction and it is only the output shaft 28 that varies in its direction of rotation. Since reversal is contemplated only when the vehicle is at a standstill, simple, face-tooth clutches are employed for non-slippage, long-life and minimum maintenance.

Braking is conveniently applied at the gearboxes 12 and 14 through the use of a disc brake mechanism located outboard of the respective gearboxes for ease of maintenance, this braking being used to augment the usual vehicle tread and rail brakes particularly at high speed. The disc 30 is attached to a stub shaft 32 which is connected to a gear element in the power train and rotatably supported in the housing of the gearbox.

A similar arrangement is provided at the other side of the vehicle, output shaft 34, in this case, providing the power input to the mixing gearbox 2 from the motors 6 and 10. For ease of assembly and disassembly, couplings 36 and 38 are provided in the drive shafts 28 and 34 between the gearboxes.

Further versatility is provided within the mixing gearbox 2 itself. Shaft 28 carries a bevel gear 40 which engages a cooperating bevel gear on shaft 44. Gears 46 and 48, affixed to shafts 44 and 50, respectively, engage to drive their respective shafts in opposite directions. Accordingly, power from engines 4 and 8, or either of them, is transmitted, through the right angle gearbox 12 and the mixing gearbox 2, to the counterrotating shafts 44 and 50.

The power train from engines 6 and 10 is somewhat different. Shaft 34 carries a bevel gear 52 which engages a cooperating bevel gear 54 carried on shaft 56. The power thus brought into the gearbox 2, as shown, is used to drive an alternator 60 through appropriate gearing, the alternator supplying auxiliary power for the train, including lighting, heating, air conditioning and other electrical services. Accordingly, in the arrangement shown, tractive power is provided to the dual axle truck by turbines 4 and 8 and auxiliary power is furnished by turbine engines 6 and 10 or either one of them.

To foster the versatility of the system, an alternative or supplementary power transmission may be incorporated therein. Clutch means is provided within the gearbox whereby, at a preselected speed, turbines 6 and 10 may additionally be utilized for tractive power, the auxiliary power being tapped from the gearbox 2. For this purpose, the clutch means permits engagement of gears at surfaces 64 and 66. This may be done either manually or automatically. In automatic operation a centrifugal clutch is used, engageable at a selected predetermined shaft speed. It will be noted that, depending upon the demands of the auxiliary load, just a single turbine need usually be kept at a speed when tractive power is not needed, and for this purpose either turbine 6 or turbine 10 may be used. It is, of course, understood that, without additional compensation, an alternator generally requires a constant speed drive, and such compensation, although not shown, is contemplated when using this type of auxiliary power generator.

In a variation of the above-described arrangement and in order to adapt the drive system to a different source of right-of-way power, as hereinbefore discussed, a D.C. traction motor may be substituted for alternator 60, auxiliary power being supplied from a different source. In this case it is possible to eliminate the clutch internal of the gearbox and, by connecting the shaft 50 to the bevel gear 54, utilize the four gas turbine engines or the D.C. traction motor or any combination of them for furnishing motive power to the truck. At the juncture of the divergent power systems, the appropriate drive would be energized and the other system disengaged. A centrifugal clutch may be employed to provide engagement and disengagement of the electric traction motor, the centrifugal clutch reacting as a function of the D.C. motor shaft speed. In this arrangement it will be noted that no sudden lapse in power need occur in the transaction from one mode to the other mode of propulsion since the systems may be gradually phased together by the simple increase of power to one type system and the decrease of power in the other system.

Power from the mixing gearbox 2 is taken through shafts 44 and 50 through universal-jointed propeller shafting 70 and 72 to the dual axle truck. Shaft 70 is used to drive the axle 74 through a spiral bevel pinion and gear reduction. Similarly, shaft 72 is used to drive axle 80 through similar gearing whereby the respective driven axles are caused to rotate in the same direction at the same speed. To reduce the unsupported length of the shaft 72 to the axle 80 which is furthest removed from the power source, this shaft is appropriately supported in a pillow block 82 which is attached to the housing of gearbox 76, preferably as shown, with suitable universal jointing.

By this invention it will be readily seen that there has been provided a lightweight vehicle drive system of outstanding versatility and adaptability and one of which is particularly adapted to the propulsion of advanced high performance railway units.

While the present invention has been described in connection with a particular preferred embodiment and several alternative arrangements, other modifications will be obvious to those skilled in the art within the scope of the appended claims.

What is claimed is:

1. A drive sytem for a lightweight railway vehicle having a dual-axle truck comprising:

a plurality of engines connected to the vehicle structure, each of the engines having a driven shaft, a pair of right angles gearboxes attached to the vehicle structure, each of these gearboxes having an input shaft operatively connected to the driven shaft of at least one of the engines and a single output shaft for transmitting power from the right angle gearbox, an overriding clutch in the power train between each of the engines and its corresponding right angle gearbox, a centrally-located mixing gearbox mounted to the vehicle and having a plurality of input shafts including an input shaft for each right angle gearbox output shaft, the respective mixing gearbox input shafts being connected to their corresponding right angle gearbox output shafts, a D.C. traction motor mounted on the vehicle and having a driven shaft providing a power input to the mixing gearbox, first and second universal-jointed counterrotating propeller shafts for transmitting power from the mixing gearbox to the truck, the propeller shafts being operatively geared together, the first propeller shaft being operatively connected to drive one of the truck axles, the second propeller shaft being operatively connected to drive the other truck axle, the axles being driven in the same direction at the same speed, means for reversing the rotation of the right angle gearbox output shafts, and means for motively disengaging the D.C. traction motor.

2. A combined truck drive and auxiliary power system for a lightweight railway vehicle comprising:

a plurality of gas turbine engines mounted on the vehicle at the sides thereof, each of the engines having a driven shaft, a plurality of right angle gearboxes connected to the vehicle structure, each of these gearboxes having an input shaft aligned with and connected to the driven shaft of its associated turbine engine and having a single output shaft for transmitting power from the gearbox, each right angle gearbox including a clutch and reversing mechanism for reversing the rotation of the output shaft, an overriding clutch in the power train between each of the engines and its corresponding right angle gearbox, a centrally-located mixing gearbox mounted to the vehicle and having a plurality of input shafts, including an input shaft for each right angle gearbox output shaft, the respective input shafts being connected to their corresponding right angle gearbox output shafts, the mixing gearbox having first and second counterrotating output shafts for transmitting tractive power from the mixing gearbox and a third output shaft for transmitting auxiliary power from the mixing gearbox, the mixing gearbox power transmission being so arranged that the first and second shafts are driven by one turbine-right angle gearbox combination and the third shaft is driven by a different turbine-right angle gearbox combination, first and second universal-jointed propeller shafts connected to the first and second output shafts, respectively, the propeller shafts being operatively connected to drive the truck axles, and an auxiliary power generator mounted on the vehicle connected to and driven by the third shaft for providing auxiliary electric power.

3. The drive and power system of claim 2 in which means is provided for selectively interconnecting the tractive power and auxiliary power gear trains.

4. A lightweight drive system for a railway vehicle having a dual-axle truck comprising:

a plurality of gas turbine engines affixed to the vehicle at the sides thereof, two of the engines being mounted in confronting relationship with their axes generally parallel to the vehicle centerline, each of the engines having a driven shaft, a right angle gearbox positioned between the confronting engines, this gearbox having a pair of power input shafts connected with the corresponding driven shafts on the confronting engines, and a single power output shaft, a centrally-located mixing gearbox carried by the vehicle including an operative connection to the right angle gearbox output shaft for conducting power into the mixing gearbox, a pair of universal-jointed counterrotating propeller shafts for transmitting power from the mixing gearbox to the truck axles, and operative connections thereto, means integral with the right angle gearbox for reversing the direction of rotation of its output shaft, and means for selectively and automatically disengaging one or both of the confronting turbine engines from the overall power train.

5. A combined truck drive and auxiliary power system for a lightweight railway vehicle comprising:

a plurality of engines connected to the vehicle structure, each of the engines having a driven shaft;

a centrally located mixing gearbox mounted to the vehicle and having a plurality of input shafts, the mixing gearbox having first and second counterrotating output shafts for transmitting tractive power from the mixing gearbox and a third output shaft for transmitting auxiliary power from the mixing gearbox;

a plurality of gearboxes attached to the vehicle structure and located intermediate the engines and the centrally located mixing gearbox, each of the intermediate gearboxes having an input shaft operatively connected to the driven shaft of at least one of the engines and a single output shaft operatively connected to one of the input shafts of the mixing gearbox;

first and second universal-jointed propeller shafts connected to the first and second mixing gearbox output shafts, respectively, the propeller shafts being operatively connected to drive the truck axles;

an auxiliary power generator mounted on the vehicle connected to and driven by the third mixing gearbox output shaft for providing auxiliary electric power;

an overriding clutch in the power train between each of the engines and its corresponding intermediate gearbox;

and means for reversing the rotation of the intermediate gearbox output shafts.

6. A combined truck drive and auxiliary power system for a lightweight railway vehicle comprising:

a plurality of engines connected to the vehicle structure, each of the engines having a driven shaft;

a mixing gearbox mounted to the vehicle and having a plurality of input shafts, the mixing gearbox having first and second counterrotating output shafts for transmitting tractive power from the mixing gearbox and a third shaft for transmitting auxiliary power at the mixing gearbox;

a plurality of gearboxes attached to the vehicle structure and located intermediate the engines and the mixing gearbox, each of the intermediate gearboxes having an input shaft operatively connected to the driven shaft of at least one of the engines and a single output shaft operatively connected to one of the input shafts of the mixing gearbox;

first and second universal-jointed propeller shafts connected to the first and second mixing gearbox output shafts, respectively, the propeller shafts being operatively connected to drive the truck axles;

auxiliary power means mounted on the vehicle connected to the third mixing gearbox shaft for providing auxiliary power;

an overriding clutch in the power train between each of the engines and its corresponding intermediate gearbox;

and means for reversing the rotation of the intermediate gearbox output shafts.

References Cited

UNITED STATES PATENTS

| | | | |
|---|---|---|---|
| 1,680,025 | 8/1928 | Losel | 105—36 |
| 1,851,068 | 3/1932 | Swabb | 105—35 |
| 2,262,710 | 11/1941 | Lang | 105—118 X |
| 2,358,279 | 9/1944 | Piron | 105—133 |
| 2,619,800 | 12/1952 | Fell. | |
| 3,273,515 | 9/1966 | Oestreicher et al. | 105—38 X |

ARTHUR L. LA POINT, *Primary Examiner.*

J. E. BABER, H. BELTRAN, *Assistant Examiners.*